Jan. 19, 1965 W. EISENBERG 3,166,288

MEMORANDUM PAD HOLDER FOR WALL TELEPHONE

Filed Dec. 13, 1963 2 Sheets-Sheet 1

INVENTOR.
WILLIAM EISENBERG
BY Charles M. Hogan
ATTORNEY.

Jan. 19, 1965 W. EISENBERG 3,166,288

MEMORANDUM PAD HOLDER FOR WALL TELEPHONE

Filed Dec. 13, 1963 2 Sheets-Sheet 2

INVENTOR.
WILLIAM EISENBERG
BY Charles M. Hogan
ATTORNEY.

United States Patent Office 3,166,288
Patented Jan. 19, 1965

3,166,288

MEMORANDUM PAD HOLDER FOR WALL TELEPHONE

William Eisenberg, 4475 Broadhurst Drive, Columbus, Ohio

Filed Dec. 13, 1963, Ser. No. 330,448
5 Claims. (Cl. 248—441)

The present invention relates generally to home and office memory aids and particularly to devices for conveniently recording notes of telephone messages received, reminders, telephone numbers and intra-family and intra-office communications.

Recognizing that many telephone users habitually jot down telephone numbers and received messages on scraps of paper, often lost, or on the telephone book, local telephone companies and office suppliers have distributed small bound notebooks for memorandum purposes. These books, too, are frequently misplaced or dissociated from a readily available pencil or pen. While offices are generally provided with procedures and various human aids designed to assure the taking and presentation of notes and memoranda, kitchen blackboards and telephone book notations bear witness to a household need for a convenient message center.

One of the concepts of the present invention is the selection of the wall type telephone as the message and memoranda center.

A primary object of the invention is to provide a novel memorandum pad holder in the form of an accessory for attachment to a wall telephone, in such manner as to accomplish the advantages mentioned below.

The invention provides:

First, a reliable, always conveniently present, holder for writing implements, i.e., tablets for notations, and pencil;

Second, a holder which positions the tablets in such a way that they are conveniently used, without interrupting telephone conversations;

Third, a holder which does not occupy commonly used room space;

Fourth, a holder which is easily and firmly attached to a wall type telephone;

Fifth, a holder which is stabilized both by the bearing support afforded by the usual vertical room wall and the anti-slip support provided by a wall telephone itself;

Sixth, a holder which is comprised of simple geometrical forms and shapes so that it may readily be molded and economically manufactured in quantity;

Seventh, a holder which is low in cost and is preferably made of plastic material;

Eighth, a holder which may easily be adapted to the decorative theme of the room in which it is used; and Ninth, a holder which may readily be modified to fit into environments in which available space on one side of the wall telephone is limited.

For a better understanding of the present invention, together with other and further objects, advantages and capabilities thereof, reference is made to the following description of the accompanying drawings, in which.

Figure 1:
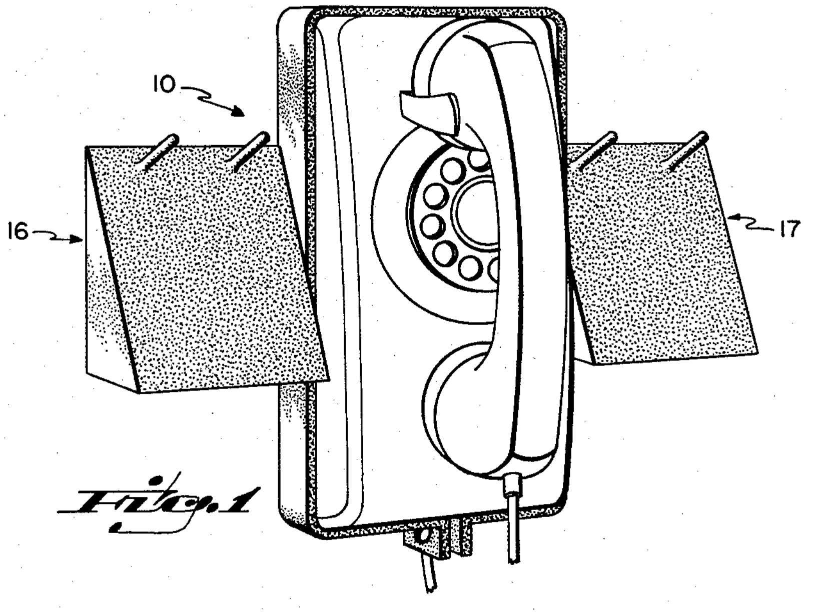
FIG. 1 is a perspective view of a preferred form of memorandum pad and pencil holder in accordance with the invention as taken from a point of view in front of and slightly lateral with respect to a wall type telephone on which the novel holder is installed.
Figure 2:
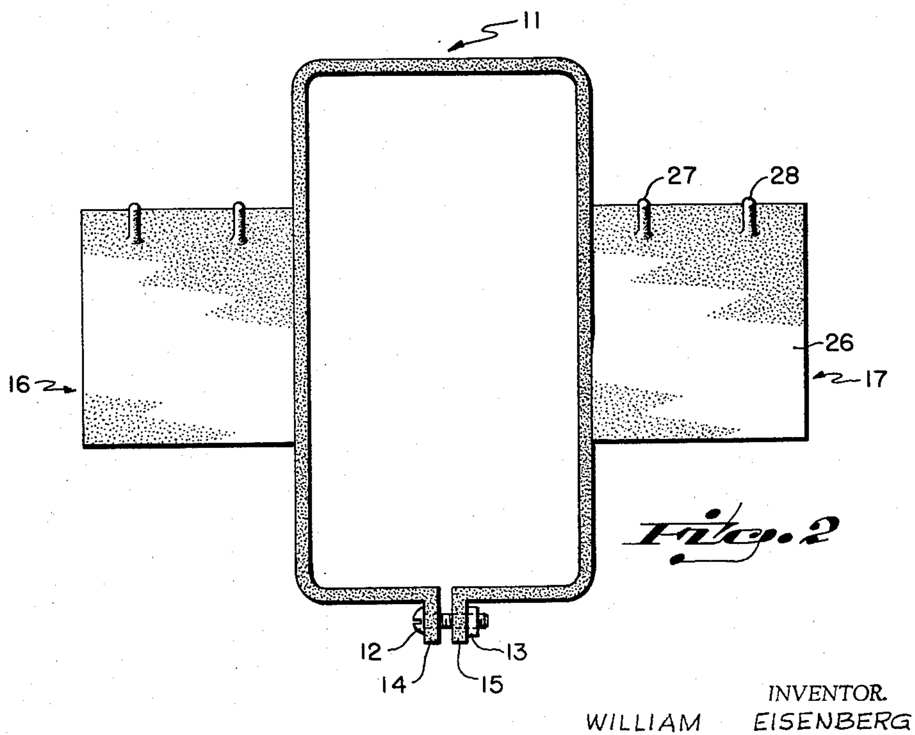
FIG. 2 is a top plan view of the holder per se, assuming it to be disposed on a horizontal plane.

Referring now to the drawings, and particularly FIG. 1, there is illustrated a conventional wall type telephone 10, which comprises a generally rectangular base to which are secured the dialing mechanism and cradle and hand set. This type of telephone is installed in a position abutting the vertical wall of a room.

In accordance with the invention, my novel memorandum pad holder is mounted on and secured to the body of the telephone 10. The memorandum pad holder is preferably made of plastic material and it comprises an integral strap or clamp portion 11 arranged in rectangular loop configuration firmly to embrace the telephone base 10 and to be securely fastened thereon by any conventional fastening expedient, such as bolt 12 and nut 13, the bolt projecting through downwardly extending lugs 14 and 15 which constitute the ends of the clamp.

Figure 3:
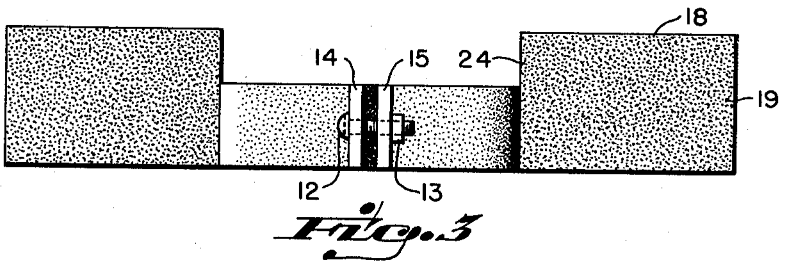
FIG. 3 is an elevational view of the near end of the FIG. 2 embodiment.
Figure 4:
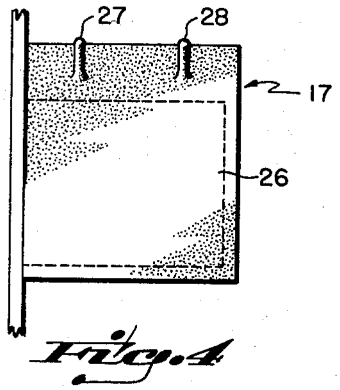
FIGS. 4 and 5 are top plan and bottom views of the right hand tablet-supporting portion of FIG. 2, the expression "right hand" referring to an observer looking at FIG. 2.
Figure 5:
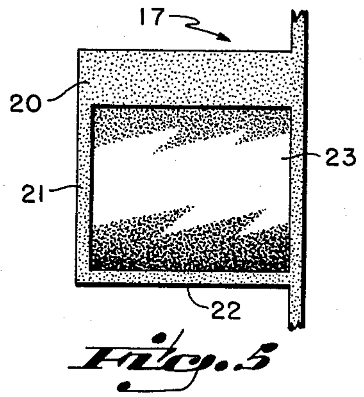

Symmetrically disposed and respectively integrally connected to the individual vertical sides of the clamp are the memorandum supporting platforms 16 and 17. These are symmetrically disposed and arranged so that the specific description will be primarily directed to the right hand platform 17, the platform 16 being the left hand counterpart thereof. Platform portion 17 comprises an integral horizontally extending (in normal usage) bottom panel 18 (FIG. 3), an outer side panel 19, and an inner side panel 24, as well as a back panel 20, and the front or main supporting panel 26, all integrally related in a generally wedge shaped form with the apex of the wedge at the top.

For purposes of economy in the use of material, while maintaining structural strength, the rear panel 20 is comprised of a wide upper margin and a narrow side margin 21, and a narrow bottom margin 22, providing an open rectangular area 23. Similarly the inner panel 24 (i.e. the panel adjacent the clamp) is formed with a triangular cut-out portion 25, the residual margins being adequate to provide unitary integrity.

Figure 7:
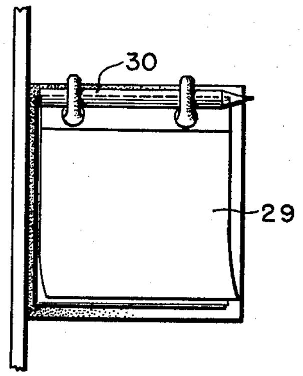
FIG. 7 is a view similar to FIG. 4 but showing a memorandum pad and tablet in place.
Figure 6:
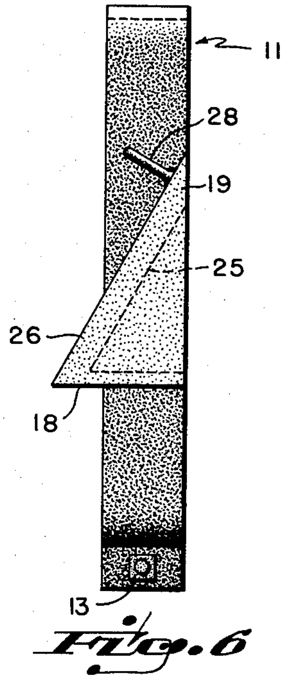
FIG. 6 is an elevational view of the right side of the holder per se when the holder is in the vertical position illustrated in FIG. 1.

Formed integrally with the front panel 26 and disposed near the apex of the platform portion 17 are a pair of spaced tablet supporting posts 27 and 28. As best shown in FIG. 7, a tablet 29 having apertures through its bound margin is simply placed on front panel 26 so that the apertures register with the posts 27 and 28 for securing the tablet in place. A pencil 30 may conveniently be placed in spanning relationship to these posts, the posts being inclined at a vertically extending oblique angle whereby to provide security for both the memorandum pad or tablet and the pencil.

One of the advantages of the invention resides in the fact that the writing tablet on platform 17 is held in a natural and secure position for writing, without interfering in any way with the posture appropriate for telephone conversation. Additionally, the structure secures and renders readily available both the pencil and the memorandum pad. Since there are two platforms, two memorandum pads are provided for.

It is common knowledge that the margins between wall telephones and adjacent doors or windows are frequently quite small. Sometimes a large appliance or door molding is very close to the wall telephone on one side but there is adequate space on the other, for example the right side. In other installations the space may be adequate only on the left side. An advantage of the present invention is that when such a space problem exists, either platform may readily be sawed off by simply sawing along the line of abutment between the vertical clamp portion and the inner panel of the platform portion to be dispensed with for a particular installation.

One of the advantages of the invention resides in the fact that the tablets such as 29 (FIG. 7) are supported in a natural position for convenient writing. The posts 27–28 are inclined so as to facilitate the ready location of a tablet and also conveniently to hold a pencil 30.

The entire structure comprising the members 11, 16 and 17 is preferably integral and made of a plastic material. The memorandum pad holder may be made of a clear plastic or in any one of a variety of colors, depending upon the location with respect to which harmony, blend or contrast may be desired.

It will be noted that the wedge-like configuration of the supporting platforms is such as to transmit the bearing forces of writing to the vertical wall on which the telephone is installed, whereby the platform is not only secure but forces exerted against the telephone itself are minimized.

While there has been shown and described what is at present considered to be the preferred embodiment of the invention, it will be understood by those skilled in the art that various changes and modifications may be made therein within the scope of the claims appended hereto.

Having described my invention, I claim:

1. A wall-telephone accessory for holding memorandum pads comprising:
 a generally rectangular loop-shaped clamp member formed and vertically positioned to be secured around the body of a wall type telephone having a mounting face and adapted to be mounted on a vertical supporting wall;
 a first wedge-shaped tablet-supporting platform member located at one side of said clamp member with its apex upward; and
 a second wedge-shaped tablet-supporting platform member located on the other side of said clamp member with its apex upward,
  said platform members being formed with front panel portions sloping obliquely upwardly and toward the mounting face of said telephone and said supporting wall whereby to provide rigid support for the tablets.

2. A wall telephone accessory for holding memorandum pads comprising:
 a generally rectangular loop-shaped clamp member formed and vertically positioned to be secured around the body of a wall type telephone having a mounting face and adapted to be mounted on a vertical supporting wall;
 a first wedge-shaped tablet-supporting platform member located at one side of said clamp member with its apex upward; and
 a second wedge-shaped tablet supporting platform member located on the other side of said clamp member with its apex upward,
  said platform members being integral with said clamp member and formed with front panel portions sloping obliquely upwardly and toward the mounting face of the telephone and said support wall whereby to provide rigid support for the tablets.

3. A wall-telephone accessory for holding a memorandum pad comprising:
 a generally rectangular loop-shaped clamp member formed and vertically positioned to be secured around the body of a wall telephone having a mounting face and adapted to be mounted on a vertical supporting wall; and
 a wedge-shaped tablet-supporting platform member located at one side of said clamp member with its apex upward,
  said platform member being formed with a front panel portion sloping obliquely upwardly and toward the mounting face of the telephone and said supporting wall whereby to provide rigid support for the tablet.

4. A wall-telephone accessory for holding memorandum pads comprising:
 a generally rectangular loop-shaped plastic clamp member formed and vertically positioned to be secured around the body of a wall telephone having a mounting face and adapted to be mounted on a vertical supporting wall;
 a first plastic tablet-supporting platform member located at one side of said clamp member; and
 a second plastic tablet-supporting platform member located on the other side of said clamp member,
  said platform members being formed integrally with said clamp member with front panel portions sloping obliquely upwardly and toward the mounting face of said telephone and said supporting wall whereby to provide rigid support for the tablets.

5. A wall-telephone accessory for holding memorandum pads comprising:
 a generally rectangular loop-shaped clamp member formed and vertically positioned to be secured around the body of a wall telephone having a mounting face and adapted to be mounted on a vertical supporting wall;
 a first tablet-supporting platform member secured to one side of said clamp member; and
 a second tablet-supporting platform member secured to the other side of said clamp member, said platform members sloping upwardly toward the mounting face of the telephone and said supporting wall.

References Cited by the Examiner

UNITED STATES PATENTS

| | | | |
|---|---|---|---|
| D. 164,173 | 8/51 | Ives | 74—1 XR |
| 1,930,175 | 10/33 | Mather | 281—15 |
| 2,667,367 | 1/54 | Lapinski | 281—6 |
| 2,929,886 | 3/60 | Marback | 179—146 |

FOREIGN PATENTS

| | | |
|---|---|---|
| 530,471 | 12/40 | Great Britain. |

FRANK B. SHERRY, *Primary Examiner.*